United States Patent
Cahill (10) Patent No.: US 7,103,219 B2
(45) Date of Patent: Sep. 5, 2006

(54) POPULATION MIXTURE MODELING WITH AN INDETERMINATE NUMBER OF SUB-POPULATIONS

(75) Inventor: Nathan D. Cahill, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 507 days.

(21) Appl. No.: 09/833,377

(22) Filed: Apr. 12, 2001

(65) Prior Publication Data

US 2002/0196975 A1 Dec. 26, 2002

(51) Int. Cl.
G06K 9/00 (2006.01)
G06K 9/34 (2006.01)
G06K 9/38 (2006.01)

(52) U.S. Cl. ............... 382/171; 382/170; 382/172
(58) Field of Classification Search ........... 382/168, 382/170–173
See application file for complete search history.

(56) References Cited

U.S. PATENT DOCUMENTS

| 5,136,686 A | 8/1992 | Koza ............... 395/13 |
| 6,004,015 A | 12/1999 | Watanabe et al. ........ 364/148 |

OTHER PUBLICATIONS

Neves, Nguyen, and Torres. "A Study of a Non-Linear Optimization Problem Using a Distributed Geenetic Algorithm". Aug. 1996, Proceedings of the 1996 International Conference on Parallel Processing (ICPP '96)-vol. 2. pp. 29-36.*

Martinez and Vitrià. "Learning Mixture Models Using a Genetic Version of the EM Algorithm". Jul. 2000. Pattern Recognition Letters.vol. 21 , Issue 9 (Jul. 2000). pp. 759-769.*

David Levine. "Statistics for Managers Using Microsoft Excel"—Powerpoint Presentation (Chapter 14: Multiple Regression Models). 1999 © Prentice Hall.*

Press, Teukolsky, Vetterling and Flannery. "Numerical Recipes in C: The Art of Scientific Computing". 1992 © Cambridge Univesity Press, 2nd Ed. pp. 656-657, 671-681.*

M. Mitchell and S. Forrest, "Genetic Algorithms and Artificial Life", Artificial Life, vol. 1, No. 3 (1994), pp. 267-289.*

"Digital Image Processing" by Rafael C. Gonzales and Paul Wintz. Addison-Wesley Publishing Company, 1977, pp. 325-331.

"Global Optimization: Techniques and Applications" by Nathan D. Cahill. Rochester Institute of Technology Master's Thesis, May 1, 2000.

"Optimal Thresholding—A New Approach" by Wesley Snyder, Griff Bilbro, Ambalavaner Logenthiran and Sarah Rajala. Pattern Recognition Letters 11, 1990, pp. 803-810.

"Optimal histogram partitioning using a simulated annealing technique" by R. Brunelli. Pattern Recognition Letters, 13, 1992, pp. 581-586.

* cited by examiner

Primary Examiner—Bhavesh M. Mehta
Assistant Examiner—Wes Tucker
(74) Attorney, Agent, or Firm—David M. Woods (57) ABSTRACT

A method and apparatus for determining the best fit of a population mixture model to data. In the digital imaging area, the use of histogram data is employed. A plurality of sub-population functions are defined and then optimized to fit the data. An objective function is employed, which is based upon the parameters of the underlying functions. The number of underlying functions is added to the parameter mix, such that no a priori knowledge of the number of sub-populations is required. In an illustrative embodiment, a genetic algorithm is used to evolve the objective function to an optimal fit of the data. Once an optimal fit is found, through comparison with stopping criteria in a fitness function, the data is segmented according to threshold determined based of classification error in the data.

34 Claims, 3 Drawing Sheets

POPULATION MIXTURE MODELING WITH AN INDETERMINATE NUMBER OF SUB-POPULATIONS

BACKGROUND OF THE INVENTION

1. Field of the Invention

The present invention relates generally to data processing. More particularly, the present invention relates to the field of population mixture modeling and threshold segmentation of data.

2. Description of the Related Art

Optimization problems arise in nearly every area of science and engineering. For example, a chemist may want to determine the minimum energy structure of a certain polymer, a biologist may need to investigate optimal dosages and scheduling of drugs administered to a cancer patient, a civil engineer may need to decide how many elevators to place in an office building so that waiting times are minimized, or an image scientist may wish to be able to automatically locate people in an image. A typical optimization problem takes the form of: minimize $f(x)$; subject to $x \epsilon D$. Where $x=(x_1, x_2, \ldots, x_n)^T$ is a vector of parameters, and $f$ is an objective function. Stated another way: find $x^*$ such that $f(x^*) \leq f(x)$ for all $x \epsilon D$. Note that the converse problem, maximization problem, can be posed in this manner by simply negating $f(x)$. If D is a discrete set, the problem is referred to as a combinatorial optimization problem. On the other hand, if D is closed and $f(x)$ is continuous over its domain, this is a continuous optimization problem.

A variety of methods exist to determine local solutions for both combinatorial and continuous optimization problems. That is, x' is a local solution if $f(x') \leq f(x)$ for all $x \epsilon N \cap D$, where N is a neighborhood of x'. For combinatorial problems, a simple choice is the iterative improvement method, which is also properly described as a 'deterministic descent' method. More sophisticated methods, such as a branch and bound method, which is a method that solves a series of continuous optimization problems, are also known in the art. For continuous problems, a variety of local minimization methods also exist. Such methods require function values (simplex), function values and derivatives (conjugate gradient and quasi-Newton methods), or function values first and second derivatives (Newton and restricted step methods). In situations where D is compact, it can be represented by the intersection of equality and inequality constraints. Such constrained optimization problems arise frequently in practice and can be solved in a variety of ways; many of which are based on the theory of Lagrange multipliers.

The problem of global optimization is much more complicated. Theoretically, global minimization is as simple as finding the minimum of all local minima and boundary points. In application, this can be impractical. Most local optimization techniques require an initially feasible point $x^{(1)} \epsilon D$ from which to begin an algorithmic process of optimization. In order to find a given local minima, it is necessary to choose a feasible point that will converge to that minima. However, because there are often times many local minima, determining such a feasible point for a particular local minima can be as difficult as solving the optimization problem itself.

Global optimization problems can be categorized as either stochastic or deterministic problems. Stochastic, or Monte Carlo, methods (e.g., random search, Metropolis algorithm, simulated annealing, genetic algorithms, etc.) randomly sample D in an attempt to locate feasible points that are local minima (or lie sufficiently close to local minima). Deterministic methods carry out some non-random search procedure to sift through local minima and find the global minimum. For example, branching techniques set up simple sub-problems, which are individually solved. Sub-energy tunneling techniques iteratively transform the objective function to remove local minima. Path following techniques indirectly locate local minima by solving a system of differential equations.

In the field of digital imaging, optimization techniques are useful as part of a point-based image segmentation process. Segmenting grayscale images is a useful task in imaging science. Image segmentation can be used directly for image compression or as a preprocessing step for background removal, feature detection, or pattern recognition algorithms, or possibly other applications. A wide variety of segmentation techniques have emerged in the literature over the last two decades. The simplest methods, and the most efficacious to representation as a global optimization problem, are point-based, where each pixel is quantized based on thresholds determined by analysis of the histogram of the image. There also exist more sophisticated (and time consuming) approaches that are the region-based methods, which take into account local spatial characteristics of the image while quantizing each pixel. Naturally, these techniques are equally applicable to color images.

Generally, point-based image segmentation is comprised a several discrete operations. First a histogram of a digital image is generated. Second, parameters for a plurality of probability density functions are determined, which correspond to a like number of sub-populations in the histogram data. Third, threshold levels are specified segmenting the image data population according to the probability density functions. And fourth, the threshold levels are applied to the histogram. Optimization, or more particularly minimization, occurs with respect to the second operation.

A population mixture model is a probability density function that can be expressed as the weighted sum of multiple sub-populations (other probability density functions). In applications such as image segmentation or cluster analysis, algorithms exist in the prior art that require fitting a population mixture model to a given set of data (a histogram in the case of image segmentation). Current methods for determining the optimal parameters of the population mixture model require prior knowledge of the number of sub-populations appropriate for the data being analyzed. In the prior art, this knowledge is frequently attained by manual inspection or by an automatic preprocessing step. Alternatively, optimization techniques utilizing a multi-start approach have been employed. Such methods fit the model repeatedly for different numbers of sub-populations. Multi-start approaches have two major drawbacks, however. The maximum number of sub-populations is arbitrarily chosen by some preprocessing step, and the computational effort required to repeatedly fit the model is immense.

Therefore, there is a need in the art to eliminate manual, preprocessing, and other multi-start approaches to population mixture modeling that require a priori knowledge of the number of sub-populations appropriate to a given data set prior to conducting an optimization process, or require immense computational effort, like the multistart approach.

SUMMARY OF THE INVENTION

The need in the art is addressed by the systems and methods of the present invention. In accordance with the invention, a method of fitting a plurality of sub-population functions to data is taught. The method comprises the steps of defining a plurality of functions according to a plurality of function parameters and a total number of functions and generating a model based on the plurality of function parameters. Then, determining an objective function for fitting error between the model and the data and comparing the fitting error to stopping criteria, and determining if the fitting error does not satisfy the stopping criteria. Finally, altering the plurality of function parameters and the total number of functions, and repeating the generating, determining, and comparing steps.

In a refinement of the foregoing method, a further step is added which is specifying at least a first threshold value delineating the plurality of functions. In another refinement, the at least a first threshold value is calculated based upon the likelihood of misclassification of data. In another refinement, the step of segmenting the data according to the at least a first threshold value is added. In another refinement, the objective function is defined as a vector representation of the plurality of function parameters. In another refinement the model is defined as a vector representation of the plurality of function parameters. In another refinement, the altering step is accomplished by evolving the plurality of function parameters and the total number of functions according to a genetic algorithm. In another refinement, the genetic algorithm evolves the plurality of function parameters through mutation and crossover. In another refinement, the plurality of functions are normal distributions, and the plurality of functions parameters include the mean and standard deviations of the normal distributions. In another refinement, the comparing step includes the utilization of a statistical f-test to evaluate the relative contribution of each of the plurality of functions in comparison of the fitting error and the data. In another refinement, the data is organized as a histogram. In another refinement, the stopping criteria are defined by a fitness function. In another refinement, the fitness function is optimized to minimize the magnitude of the fit error between the objective function and the data.

The present invention also teaches an apparatus for fitting a plurality of sub-population functions to data. That apparatus comprises a means for defining a plurality of functions according to a plurality of function parameters and a total number of functions and a means for generating a model based on the plurality of function parameters. In addition, a means for determining an objective function for fitting error between the model and the data and a means for comparing the fitting error to stopping criteria, and wherein if the comparison determines that the fitting error does not satisfy the stopping criteria,. And, the apparatus is operable to effect a means for altering the plurality of function parameters and the total number of functions, and operable to repeat the generating, determining, and comparing operations.

In a refinement of the foregoing apparatus, it further comprising means for specifying at least a first threshold value delineating the plurality of functions. In another refinement, the at least a first threshold value is calculated based upon the likelihood of misclassification of data. In another refinement, the apparatus further comprises a means for segmenting the data according to the at least a first threshold value. In another refinement, the objective function is defined as a vector representation of the plurality of function parameters. In another refinement, the model is defined as a vector representation of the plurality of function parameters. In another refinement, the means for altering operation is accomplished by evolving the plurality of function parameters and the total number of functions according to a genetic algorithm. In another refinement, the genetic algorithm evolves the plurality of function parameters through mutation and crossover. In another refinement, the plurality of functions are normal distributions, and the plurality of functions parameters include the mean and standard deviations of the normal distributions. In another refinement, the means for comparing includes the utilization of a statistical f-test to evaluate the relative contribution of each of the plurality of functions in comparison of the fitting error and the data. In another refinement, the data is organized as a histogram. In another refinement, the stopping criteria are defined by a fitness function. In another refinement, the fitness function is optimized to minimize the magnitude of the fit error between the objective function and the data.

The present invention also teaches a specific application directed to the field of digital imaging. A method of specifying thresholds for segmenting a digital image is taught. That method comprises the steps of producing a histogram of the image, having histogram data and defining a plurality of functions according to a plurality of function parameters and a total number of functions. Then, generating a model based on the plurality of function parameters and determining an objective function for the fitting error between the model and the histogram data. Next, comparing the fitting error to stopping criteria and altering the plurality of function parameters and the total number of functions, and repeating the generating, determining, and comparing steps if the fitting error does not satisfy the stopping criteria. Finally, specifying at least a first threshold value delineating the plurality of functions if the fitting error satisfies the stopping criteria.

In a refinement to the imaging method, the at least a first threshold value is calculated based upon the likelihood of misclassification of the histogram data. In another refinement, the objective function is defined as a vector representation of the plurality of function parameters. In another refinement the model is defined as a vector representation of the plurality of function parameters. In another refinement, the altering step is accomplished by evolving the plurality of function parameters and the total number of functions according to a genetic algorithm. In another refinement, the genetic algorithm evolves the plurality of function parameters through mutation and crossover. In another refinement, the plurality of functions are normal distributions, and the plurality of functions parameters include the mean and standard deviations of the normal distributions. In another refinement, the comparing step includes the utilization of a statistical f-test to evaluate the relative contribution of each of the plurality of functions in comparison of the fitting error and the data. In another refinement, the stopping criteria are defined by a fitness function. In another refinement, the fitness function is optimized to minimize the magnitude of the fit error between the objective function and the data.

The present invention also teaches an apparatus for determining thresholds for segmenting a digital image. The apparatus includes a means for producing a histogram of the image, having histogram data and a means for defining a plurality of functions according to a plurality of function parameters and a total number of functions. Also, a means for generating an objective function based on the plurality of function parameters and a means for determining a fitting error between the objective function and the histogram data.

Also, a means for comparing the fitting error to stopping criteria and a means for altering the plurality of function parameters and the total number of functions, and repeating the generating, determining, and comparing operations if the fitting error does not satisfy the stopping criteria. Finally, a means for specifying at least a first threshold value delineating the plurality of functions if the fitting error satisfies the stopping criteria.

In a refinement to the foregoing apparatus, the at least a first threshold value is calculated based upon the likelihood of misclassification of the histogram data. In another refinement, the objective function is defined as a vector representation of the plurality of function parameters. In another refinement, the altering operation is accomplished by evolving the plurality of function parameters and the total number of functions according to a genetic algorithm. In another refinement, the genetic algorithm evolves the plurality of function parameters through mutation and crossover. In another refinement, the plurality of functions are normal distributions, and the plurality of functions parameters include the mean and standard deviations of the normal distributions. In another refinement, the means for comparing includes the utilization of a statistical f-test to evaluate the relative contribution of each of the plurality of functions in comparison of the fitting error and the data. In another refinement, the stopping criteria are defined by a fitness function. In another refinement, the fitness function is optimized to minimize the magnitude of the fit error between the objective function and the data.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The current invention is a technique for modeling data as the mixture of an indeterminate number of functions. The method employs a global optimization technique, as generally described in the background section of this disclosure, to solve a problem such as the nonlinear least squares problem. This is through utilization of a population mixture model. There are other applications that benefit from population mixture modeling, and these represent other pertinent embodiments of the present invention. By way of example, and not limitation, these include clustering techniques that attempt to classify points in multiple dimensions as belonging to a given set of clusters. The present invention could readily be used as part of a clustering technique that would not require the number of clusters to be predetermined. Another example (in one-dimension) is found in spectroscopy, where data exists that represents some function of wavelength (usually spectral transmission or reflection). It is desirable to model the data in terms of some mixture of underlying functions (sub-populations). In general, the present invention can be embodied in any application that needs to determine how a given set of data can be described by a mixture of underlying (basis) functions.

As noted herein, segmenting gray scale images is a useful task in imaging science. Image segmentation can be used directly for image compression or as a preprocessing step for background removal, feature detection, pattern recognition algorithms, and so forth. A wide variety of segmentation techniques have emerged in the literature over the last two decades. The simplest methods are point-based, where each pixel is quantized based on thresholds determined by analysis of the histogram of the image.

Figure 1:
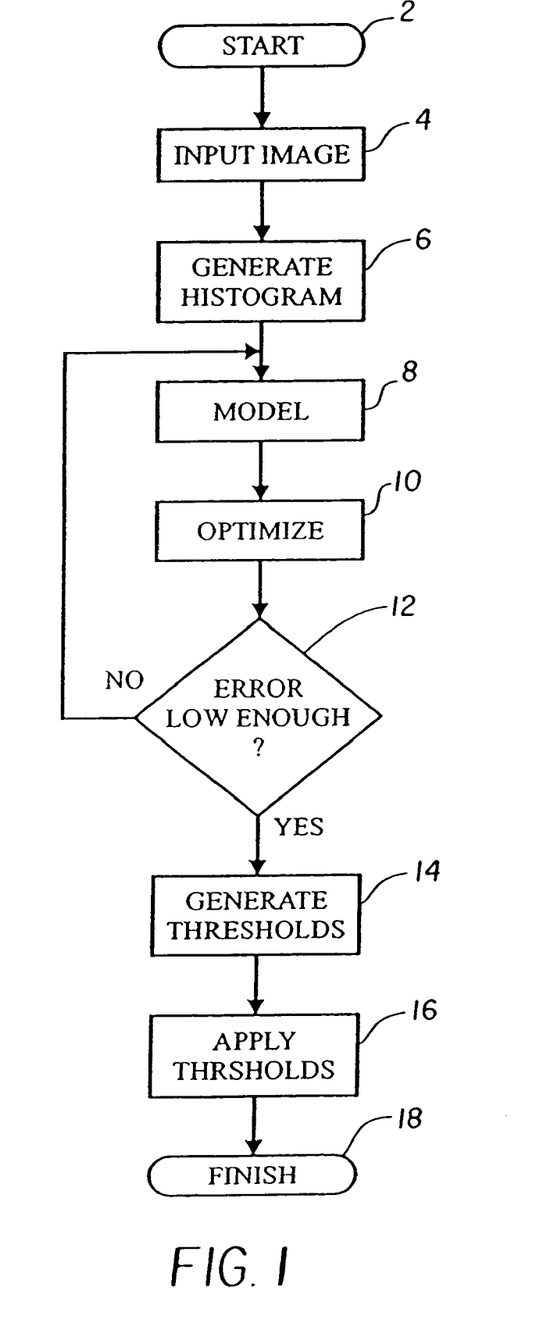
FIG. 1 is a flow diagram of an image segmentation process according to an illustrative embodiment of the present invention.

The process of segmenting an image involves several basic steps, as are illustrated as a process in FIG. 1. Such a process starts at step 2 and commences when an image is input at step 4. A histogram is generated at step 6, which is done using traditional techniques as are understood by those of ordinary skill in the art. At step 8, a mathematical model of the histogram data is created using a plurality of probability density functions, which are normal distributions in the preferred embodiment. At step 10, an optimization procedure is used to adjust the mathematical model to more closely fit the histogram data. The optimization is done at a global level. At step 12, a test is made to determine if the optimized model of functions globally fit the actual histogram data to an acceptably close level (otherwise sated as meeting the specified stopping criteria). If not, then the data is again modeled by return to step 8. If the plurality of probability density functions do meet and acceptable level of error (or stopping criteria) respecting the histogram data, the segmentation thresholds are generated at step 14. Finally, the thresholds are applied to the image data at step 18 and the process is finished at step 18, where the data set may then be used for whatever subsequent process it was intended.

The present invention is directed to the steps of modeling and optimizing the probability density functions, including selection of how many probability density functions (or sub-populations), so as to minimize the fitting error, and yielding an optimized threshold selection.

Figure 2:
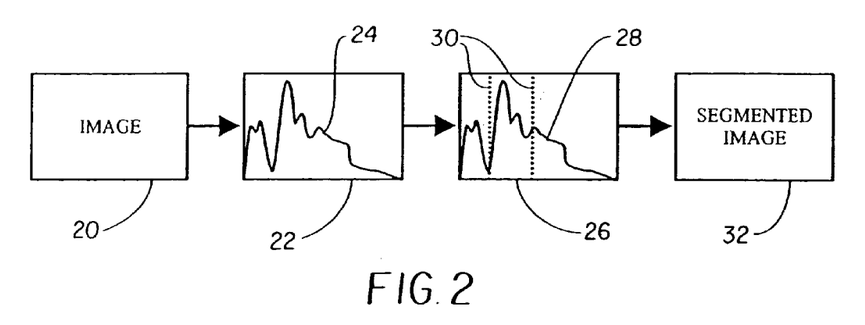
FIG. 2 is an illustration of an image segmentation process according to an illustrative embodiment of the present invention.

In its preferred embodiment, the present invention is employed as part of a point-based image segmentation process. Such a process is described by the flowchart in FIG. 2. The image 20 to be segmented is analyzed to form a histogram 22, depicted by curve 24 (a histogram is typically defined by a discrete sets of values, called 'bins'). The preferred embodiment of the present invention models the histogram data as a mixture of sub-populations, and the model parameters are used to generate thresholds according to some deterministic technique (as described generally in the background section of this disclosure). The thresholds 30 generated in this technique are shown in 26 as overlaying the histogram 28. Based on the determined thresholds, the image is segmented 32 to n levels (three in this example), where n is the number of sub-populations in the population mixture model.

The technique used to globally fit the histogram data includes developing a population mixture model and optimizing it to the data. A population mixture model is a probability density function that can be expressed as the weighted sum of multiple sub-populations (a plurality of other probability density functions). In applications such as image segmentation or cluster analysis, algorithms exist that fit a population mixture model to a given set of data (usually from a histogram). Prior art methods for determining the optimal parameters of the population mixture model require a priori knowledge of the number of sub-populations best suited to closely fit the data. This knowledge is frequently attained by manual inspection or by an automatic pre-processing step. Alternatively, optimization techniques utilizing a multi-start approach have been employed in a trial and error fashion. Such methods fit the model repeatedly for different numbers of sub-populations. Multi-start approaches have two major drawbacks. First, the maximum number of sub-populations is arbitrarily chosen by some preprocessing step, and second, the computational effort required to repeatedly fit the model is immense. The present invention obviates the need for employing a multi-start approach or requiring any a priori knowledge by including the number of sub-populations as a parameter in the model and determining the optimal model parameters through the use of a genetic algorithm.

Mathematically, a population mixture model can be modeled as a function of the form:

$$h(x, \beta, \alpha^{(1)}, \alpha^{(2)}, \ldots, \alpha^{(n)}) = \sum_{i=1}^{n} \beta_i p_i(x, \alpha^{(i)}) \quad (1)$$

where each $p_i(x, \alpha^{(i)})$ is a probability density function that is described by the parameters in $\alpha^{(i)}$ and defined for every vector x within some feasible region. $\beta$ is the weighting factor, which varies with each of the $p_i$'s. In the preferred embodiment, the $p_i$'s are taken to be normal distribution probability density functions. In the one-dimensional case, each $\alpha^{(i)}$ would be a two-element vector corresponding to the mean and standard deviation (typically identified as the $\mu$ and $\sigma$, respectively) of each $i^{th}$ normal distribution. Since the population mixture model is a probability density function, it must integrate to unity. Therefore, the constraint:

$$\sum_{i=1}^{n} \beta_i = 1 \quad (2)$$

must be satisfied.

In order to determine the optimal parameters of the population mixture model for a given set of data (i.e., m ordered pairs $(\hat{x}^{(j)}, \hat{h}_j)$), a k-dimensional objective function is constructed (where k is the sum of magnitudes of the $\beta$ and $\alpha^{(i)}$ parameters in Equation (1)), that yields its global optimum, where the population mixture model best fits the data. The global optimum can then be located though a global optimization procedure. In an illustrative embodiment of the present invention, such an optimization problem is mathematically given by:

$$\text{Minimize} \sum_{j=1}^{m} \left[ h(\hat{x}^{(j)}, \beta, \alpha^{(1)}, \alpha^{(2)}, \ldots, \alpha^{(n)}) - \hat{h}_j \right]^2 \quad (3)$$

with respect to $\beta, \alpha^{(1)}, \alpha^{(2)}, \ldots, \alpha^{(n)}$

This objective function will be understood by those of ordinary skill in the art to be the well-known sum of squared errors problem, thus classifying Equation (3) as a nonlinear least squares problem. Those of ordinary skill in the art will also generally appreciate the analytical approach to solving least squares problems. Of course, other optimization problems and/or objective functions, such as maximum likelihood functions, can be used, and fall within the scope of the present invention.

In point-based segmentation methods, the value I(u,v) at each pixel are assumed to be drawn from one of n sub-populations. As noted above, these sub-populations are normal distributions in the preferred embodiment. The histogram of the image will then appear to be a mixture of the sub-populations, as modeled in Equation (1).

Given that Equation (3) has been solved (which process will be more fully developed herein after), including a determination of the number of probability density functions (n), an optimal set of thresholds T can be calculation by minimizing classification error. The n=2 case is derived in Gonzalez, R. C. and Wintz, P. *Digital Image Processing.* Addison-Wesley, 1977.

Gonzalez and Wintz teach that if it is known a priori that an image contains only two principal brightness regions, then the histogram of that image is be considered as an estimate of the brightness probability density function. The overall density function would be the sum or mixture of two unimodal densities, one for the bright region and one for the dark region in the image. Furthermore, the mixture parameters would be proportional to the areas of the picture for each brightness. If the form of the densities is known or assumed, then it is possible to determine an optimum threshold (in terms of minimum error) for segmenting the image into the two brightness regions.

Further, suppose that an image contains two values combined with additive Gaussian noise. The mixture probability density function is given by:

$$p(x) = P_1 p_1(x) + P_2 p_2(x) \quad (4)$$

which, for the Gaussian case, is:

$$p(x) = \frac{P_1}{\sqrt{2\pi}\sigma_1} \exp\frac{(x-\mu_1)^2}{2\sigma_1^2} + \frac{P_2}{\sqrt{2\pi}\sigma_2} \exp\frac{(x-\mu_2)^2}{2\sigma_2^2} \quad (5)$$

where $\mu_1$ and $\mu_2$ are the mean values of the two brightness levels, $\sigma_1$ and $\sigma_2$ are the standard deviations about the means, and $P_1$ and $P_2$ are the a priori probabilities of the two levels. Since the constraint:

$$P_1 + P_2 = 1 \quad (6)$$

must be satisfied, the mixture density has five unknown parameters. If all the parameters are known, the optimum threshold is easily determined.

Assuming that the dark region corresponds to the background and the bright region corresponds to objects in the image, then $\mu_1 < \mu_2$ and a threshold, T, may be defined so that all pixels with brightness level below T are considered background points and all pixels with level above T are considered object points. The probability of erroneously classifying an object point as a background point is:

$$E_1(T) = \int_{-\infty}^{T} p_2(x)dx \quad (7)$$

Similarly, the probability of classifying a background point as an object point is:

$$E_2(T) = \int_{T}^{\infty} p_1(x)dx \quad (8)$$

Therefore, the overall probability of error is given by:

$$E(T) = P_2 E_1(T) + P_1 E_2(T) \quad (9)$$

To find the threshold value for which this error is minimum, differentiate E(T) with respect to T (using Liebnitz's rule) and equate the result to zero. The result is then:

$$P_1 p_1(T) = P_2 p_2(T) \quad (10)$$

Applying this result to the Gaussian density gives, after taking logarithms and simplifying, a quadratic equation:

$$AT^2 + BT + C = 0 \quad (11)$$

where:

$$A = \sigma_1^2 - \sigma_2^2 \quad (12)$$

$$B = 2(\mu_1 \sigma_2^2 - \mu_2 \sigma_1^2) \quad (13)$$

$$C = \sigma_1^2 \mu_2^2 - \sigma_2^2 \mu_1^2 + \sigma_1^2 \sigma_2^2 \ln(\sigma_1 P_1 / \sigma_2 P_2) \quad (14)$$

The possibility of two solutions indicates that it may require two threshold values to obtain the optimum solution. If the variances are equal, $\sigma^2 = \sigma_1^2 = \sigma_2^2$, a single threshold is sufficient:

$$T = \frac{\mu_1 + \mu_2}{2} + \frac{\sigma^2}{\mu_1 - \mu_2} \ln\left(\frac{P_2}{P_1}\right) \quad (15)$$

If the prior probabilities are equal, $P_1 = P_2$, the optimum threshold is just the average of the means. The determination of the optimum threshold may be accomplished easily for other unimodal densities of known form, such as the Raleigh and log-normal densities.

To estimate the parameters from a histogram of an image one may use a maximum likelihood or minimum mean-square error approach. For example, the mean-square error between the mixture density, p(x), and the experimental histogram h(x), is:

$$M = \frac{1}{N} \sum_{i=1}^{N} \{p(x_i) - h(x_i)\}^2 \quad (16)$$

where an N-point histogram is available.

Gonzalez and Wintz also note that in general, it is not a simple matter to determine analytically parameters that minimize this mean-square error. Even for the Gaussian case, the straightforward computation of equating the partial derivatives to zero leads to a set of simultaneous transcendental equations that usually can be solved only by numerical procedures. Since the gradient is easily computed, a conjugate gradient, or Newton's method for simultaneous nonlinear equations, may be used to minimize M. With either of these iterative methods, starting values must be specified. Assuming the a priori probabilities to be equal may be sufficient. Starting values for the means and variances may be determined by detecting modes in the histogram or simply dividing the histogram into two parts about its mean value, and computing means and variances of the two parts to be used as starting values.

The foregoing example teaches the n=2 case for threshold derivation, this is but one of many possibilities numbers of probability density functions that may be applicable. As is understood by those of ordinary skill in the art, the general case is an extension of the n=2 case.

The general case of image segmentation thresholding will now be further developed. Define T, the set of thresholds, $T = (T_1, T_2, \ldots, T_{n-1})^T$ and assume that $T_0 < T_1 < T_2 < \ldots < T_{n-1}, T_n$, where $$T_0 = \min_j \hat{x}_j$$

and $$T_n = \max_j \hat{x}_j.$$

Given a set of thresholds, an image I is segmented to form a new image $\hat{I}$ as follows:

$$\hat{I}(u, v) = \begin{cases} \phi(1), & T_0 \leq I(u, v) < T_1 \\ \phi(2), & T_1 \leq I(u, v) < T_2 \\ \vdots & \vdots \\ \phi(n) & T_{n-1} \leq I(u, v) \leq T_n \end{cases}, \quad (17)$$

where $\phi$ is an arbitrary one-to-one function, such as $\phi(i)=i$ or $\phi(i)=\mu_i$.

To determine the optimum set of thresholds given $\beta^*$, $\mu^*$, and $\sigma^*$, first introduce two random variables. Let X be the index of the sub-population to which a given pixel belongs, and let C be the index of the segment into which it is classified. Then the optimal T vector will maximize the probability that a pixel is correctly classified (or minimize the probability that a pixel is misclassified). Then:

$$\theta(T) = P\{\text{misclassification}\} = 1 - P\{\text{correct classification}\} \quad (18)$$

$$= 1 - \sum_{i=1}^{n} P\{C = i, X = i\}$$

$$= 1 - \sum_{i=1}^{n} P\{C = i \mid X = i\} P\{X = i\}$$

It is know that $$P\{X=i\} = \beta_i^* \text{ and } P\{C=i|X=i\} = \int_{T_{i-1}}^{T_i} p_i(x)dx,$$

therefore:

$$\theta(T) = 1 - \sum_{i=1}^{n} \int_{T_{i-1}}^{T_i} \beta_i^* p_i(x) dx. \quad (19)$$

Any point that minimizes Equation (19) satisfies $\nabla\theta(T) = 0$. From the Fundamental Theorem of Calculus, then:

$$\nabla \theta(T) = \begin{pmatrix} \beta_2^* p_2(T_1) - \beta_1^* p_1(T_1) \\ \beta_3^* p_3(T_2) - \beta_2^* p_2(T_2) \\ \vdots \\ \beta_n^* p_n(T_{n-1}) - \beta_{n-1}^* p_{n-1}(T_{n-1}) \end{pmatrix} \quad (20)$$

Therefore, any optimal vector T* satisfies $\beta_i^* p_i(T_i^*) = \beta_{i+1}^* p_{i+1}(T_i^*)$ for $i=1, \ldots, n-1$. Taking logarithms of both sides of these equations and simplfying yields quadratic equations in T*:

$$(\sigma_i^{*2} - \sigma_{i+1}^{*2})T_i^{*2} + 2(\mu_i^*\sigma_{i+1}^{*2} - \mu_{i+1}^*\sigma_i^{*2})T_i^* + \quad (21)$$

$$\mu_{i+1}^{*2}\sigma_i^{*2} - \mu_i^{*2}\sigma_{i+1}^{*2} + \sigma_i^{*2}\sigma_{i+1}^{*2}\ln\left(\frac{\sigma_i^*\beta_i^*}{\sigma_{i+1}^*\beta_{i+1}^*}\right) = 0$$

Therefore, to determine a set of optimal thresholds given the population mixture model, solve the quadratic equations given by Equation (21). It can be shown that any solution to Equation (21) that satisfies $\mu_1^* < T_1^* < \mu_2^* < T_2^* < \ldots < T_{n-1}^* < \mu_n^*$ also satisfies the second-order conditions ($\nabla^2\theta(T)$ positive definite), and hence is a local minimizer of Equation (19). The global minimizer can be found by finding the best of all the local minima.

Since it has now been demonstrated that the determination of thresholds is a straightforward deterministic process, the difficulty in the prior art with point-based methods is the determination of a population mixture model, or, otherwise stated, the difficulty is in finding a solution to Equation (3). As noted earlier, many local minima typically exist for this kind problem, so attacking it with simple local optimizers will not be adequate. Also, since the problem can potentially have high dimensionality, none of the traditional deterministic methods appear promising, except for the trivial cases. However, as mentioned above, some of the Monte Carlo techniques can be used to solve Equation (3). In an illustrative embodiment of the present invention, a genetic algorithm is utilized to solve Equation (3), and particularly in the case when n is not chosen, or otherwise known, a priori.

For fixed n, available a priori, any of a variety of global optimization techniques can be used to solve Equation (3), see generally *Global Optimization: Techniques and Applications* N. Cahill, RIT Master's Thesis, May 2000, the contents of which are hereby incorporated by reference thereto. In the context of image segmentation, Snyder, Bilbro, Logenthiran, and Rajala (*Optimal Thresholding—A New Approach*, Pattern Recognition Letters, 11:803–810, 1990) describe a tree annealing technique that solves Equation (3). However, their method requires an immense amount of storage in computer memory and can be extremely inefficient. In a practical sense, this is unacceptable as the utilization of such techniques is naturally constrained by the processing requirements each bears. One way to make such an approach more efficient is to recognize that the population mixture model Equation (1) is linear with respect to the β parameters.

Since Equation (1) is linear with respect to the β parameters, then given any set of $\alpha^{(1)}$'s, the estimation of the β parameters can be separated from the global optimization procedure, and can be computed using a deterministic method (Equation (3) becomes a least squares with equality constraints problem). Those of ordinary skill in the art will appreciate that this effectively reduces the k-dimensional objective function to a (k−n)-dimensional objective function. Thus, implying a significant reduction in processor overhead for real-world implementations.

The problem with the techniques described in the previous paragraphs is that the number of sub-populations n must be fixed and known a priori. This requires either some preprocessing step to automatically determine n, or some multi-start optimization technique that solves Equation (3) for a sequence of different values for n. Preprocessing techniques tend to be ad hoc, and, multistart procedures are extremely time, and processor resource, consuming. The present invention combines determination of the number of sub-populations with the objective function evaluation process and estimates n as part of the global optimization procedure.

The global optimization procedure used in the preferred embodiment of the present invention utilizes a genetic algorithm. Genetic algorithms are described by Holland in *Adaptation in Natural and Artificial Systems*, The University of Michigan Press, Ann Arbor, 1975, the teachings of which are hereby incorporated herein by reference. One specific application of genetic algorithms is described in U.S. Pat. No. 6,004,015 to Watenabe for OPTIMIZATION ADJUSTING METHOD AND OPTIMIZATION ADJUSTING APPARATUS, the teachings of which are hereby incorporated herein by reference. Another application of genetic algorithms used to solve a large class of problems is detailed in U.S. Pat. No. 5,136,686 to Koza for NON-LINEAR GENETIC ALGORITHMS FOR SOLVING PROBLEMS BY FITTING A FIT COMPOSITION OF FUNCTIONS, the teachings of which are hereby incorporated herein by reference.

Consideration is now directed to the process of estimating population mixtures. That is, the nonlinear least squares problem, Equation (3), which estimates the population mixture parameters for a given image histogram. For reference, Equation (3) appears again:

$$\text{Minimize} \sum_{j=1}^{m} \left[h(\hat{x}^{(j)}, \beta, \alpha^{(1)}, \alpha^{(2)}, \ldots, \alpha^{(n)}) - \hat{h}_j\right]^2 \quad (3)$$

with respect to $\beta, \alpha^{(1)}, \alpha^{(2)}, \ldots \alpha^{(n)}$

For fixed μ and σ, which are the mean and standard deviation for the normal distributions, Equation (3) is a linear least squares problem in terms of β. Taking into account the equality constraint given in Equation (2) and the inequality constraint $\beta \geq 0$, this is a standard least squares equality constraint problem (hereinafter 'LSEI') that can be solved readily for β. Therefore, Equation (3) can be solved by partitioned least squares, using Gauss-Newton to update estimates for the nonlinear parameters μ and σ and solving the resulting LSEI problem for β at each iteration. This effectively reduces the dimensionality of the nonlinear least squares problem by one third.

It is extremely difficult to find the global minimum of Equation (3), even if the problem is partitioned. If there are n modes in the population, Equation (3) describes a function in 3n-dimensional space (2n for the partitioned problem) that has a large number of local minima. Because of the relatively high dimensionality of this problem, deterministic global optimization techniques are impracticable. Therefore, Monte Carlo techniques are the only reasonable alternative. A multistart method could theoretically work, however, this is inefficient because nothing is known about the basins of attraction of the various local minima. Another possibility is simulated annealing, and this problem appears to lend itself to such an approach.

A solution to Equation (3) is described by Snyder, W., Bilbro, G., Logenthiran, A., and Rajala, S. in *Optimal Thresholding—A New Approach*. Pattern Recognition Letters, 11:803–810, 1990, the contents of which are hereby incorporated by reference thereto. That solution is via tree annealing, which is a variant of simulated annealing. In tree annealing, the search space is described by a tree, where each level of the tree describes some binary partition of one of the parameters. For Equation (3), the search space is described by $0 \leq, \mu \leq 1, \alpha_1 \sigma \leq \alpha_2,$ and $0 \leq \beta \leq 1$, where $\alpha_1$ and $\alpha_2$ are suitable lower and upper bounds on the standard deviations. The annealing procedure takes place by randomly traveling down one branch of the tree and then comparing the "leaf" point with the current iterate according to the Metropolis criterion. If the leaf point is chosen as the next iterate, another node is placed at that leaf to increase the resolution of the tree. If the Metropolis criterion is changed according to some cooling schedule, over time the tree will be highly resolved in areas of local minima.

There are two major drawbacks to the tree annealing approach. First, the size of the tree becomes enormous and storage becomes impractical, and second, it is not readily apparent how to satisfy the equality constraint in Equation (2). The first drawback can be slightly alleviated by solving the partitioned problem. Even though the dimensionality of the problem is somewhat reduced, it does not become small enough to disregard the issue of tree size. The second drawback can be ignored if a standard elimination or transformation method is used to remove the equality constraint. However, the transformed parameters will have no intuitive significance.

Another technique for histogram thresholding is given by Brunelli, R. *Optimal Histogram Partitioning Using a Simulated Annealing Technique*, Pattern Recognition Letters, 13:581–586, 1992, the contents of which are hereby incorporated by reference thereto. Simulated annealing does not attempt to fit a population model to the histogram, rather, it solves a combinatorial optimization problem via simulated annealing that yields the segmentation thresholds directly. The benefit of using this method is that it is not required (although it is useful) to determine the number of modes/thresholds prior to performing the optimization. On the other hand, this method does not yield any useful information for estimating sub-population parameters.

In Brunelli's method, the image histogram is preprocessed to locate every local minimum. A node is defined by the n local minima that are found. Seven pieces of information are stored at each node: node location, histogram value, and cumulative distribution value, location, histogram value, and cumulative distribution value of the nearest local maximum to the right of the node, and a binary flag. A configuration x is defined as the n-vector of all binary flags. Every element of x that is a one is considered to be a threshold value. There are $2^n$ possible configurations, one of which describes the optimal set of thresholds. The objective function to be minimize is then given by:

$$f(x) = -\sum_s \frac{\min(|m_s - k_{s-}|, |m_s - k_{s+}|)}{m_s}\left(1 - \frac{A_s}{m_s d_s}\right), \quad (22)$$

where s is a slice of the current configuration (a segment of the histogram corresponding to the interval containing a node $x_i=1$ and the nearest node to its right with $x_j=1$), $m_s$ is the maximum histogram value of the slice, $k_{s-}$ is the histogram value of the left node, $k_{s+}$ is the histogram value of the right node, $A_s$ is the area of the slice, and $d_s$ is the width of the slice. Since the nearest maximum and the cumulative distribution values are stored at each node, computing $m_s$ and $A_s$ is simple and efficient.

If the number of modes of the histogram is known a priori (say m modes), Equation (22) can be transformed to favor configurations with m active by defining a new objective function:

$$\hat{f}(x) = \frac{f(x)}{\alpha \left|\sum_{i=1}^n x_i - m\right| + 1}, \quad (23)$$

where α is a weighting factor.

Simulated annealing can now be used to minimize Equation (22) or Equation (23). New configurations in a "neighborhood" of the current configuration can be generated by flipping the active status of a uniformly distributed (from 1 to n) random number of bits. Brunelli teaches the use of both the geometric cooling schedule and an exponentially decaying cooling schedule, performing the Metropolis algorithm ten thousand times at each temperature level.

Both of the previously described methods for histogram thresholding have their strengths and weaknesses. Snyder's method (extended to solve the partitioned least squares problem) does a good job at finding the optimal configuration of parameters for the model in Equation (1), but it requires a priori knowledge of the number of sub-populations. Brunelli's method performs reasonably well when the number of sub-populations or desired thresholds is not known, but the notion of "goodness of shape" that it relies on is sketchy. The present invention image segmentation strategy uses genetic algorithms to find the optimal set of parameters for the histogram model in Equation (1) without requiring that the number of sub-populations n be predetermined.

Figure 3:
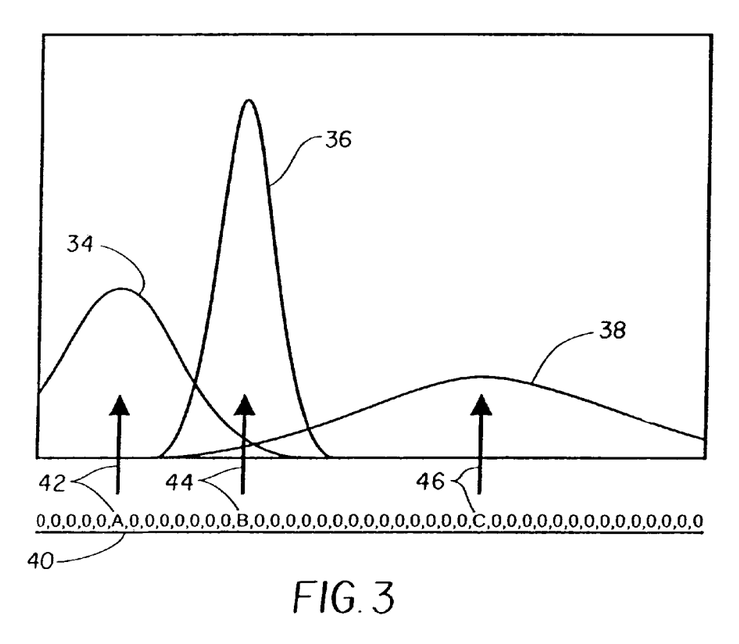
FIG. 3 is a vector representation of a population mixture model according to an illustrative embodiment of the present invention.

The present invention teaches a genetic evolution technique for histogram thresholding, including descriptions of the encoding of chromosomes, the crossover, mutation, and selection operators, and the fitness function. Any global optimization technique that is used to find the optimal parameters of the population mixture model requires the formal mathematical definition of a specific collection of parameters. In the preferred global optimization technique, this collection of parameters is called a chromosome. FIG. 3 illustrates a specific chromosome x 40 that describes a collection of sub-populations 42, 44, 46, which are probability density functions 34, 36, 38 in the preferred embodiment. The values are shown as variables A 42, B 44, and C 46 in FIG. 3. Normal distributions were selected for the probability density functions. Each normal distribution is parameterized by its mean ($\mu$) and standard deviation ($\sigma$).

Each chromosome is a length b vector 40 that defines a collection of Gaussians (normal distributions), where b is equal to the number of histogram bins. For a given chromosome x, if $x_i \neq 0$, then that configuration contains a Gaussian with mean located at the $i^{th}$ bin. (If $x_i = 0$, then that configuration contains no Gaussian centered at the $i^{th}$ bin). The value of $x_i$ is the standard deviation of that Gaussian, identified by A, B, and C in FIG. 3. Therefore, if an appropriate range for standard deviation values is defined (say $0.01 \leq \sigma \leq 0.5$) and specify a vector of c linearly spaced values spanning this range, then there exist b(c+1) possible chromosomes that provide good coverage of the $\mu$ and $\sigma$ spaces for any $n \leq b$. $\beta$ can be found by solving the LSEI problem arising from Equation (3), so $\beta$ is implicitly stored for each chromosome.

Figure 4:
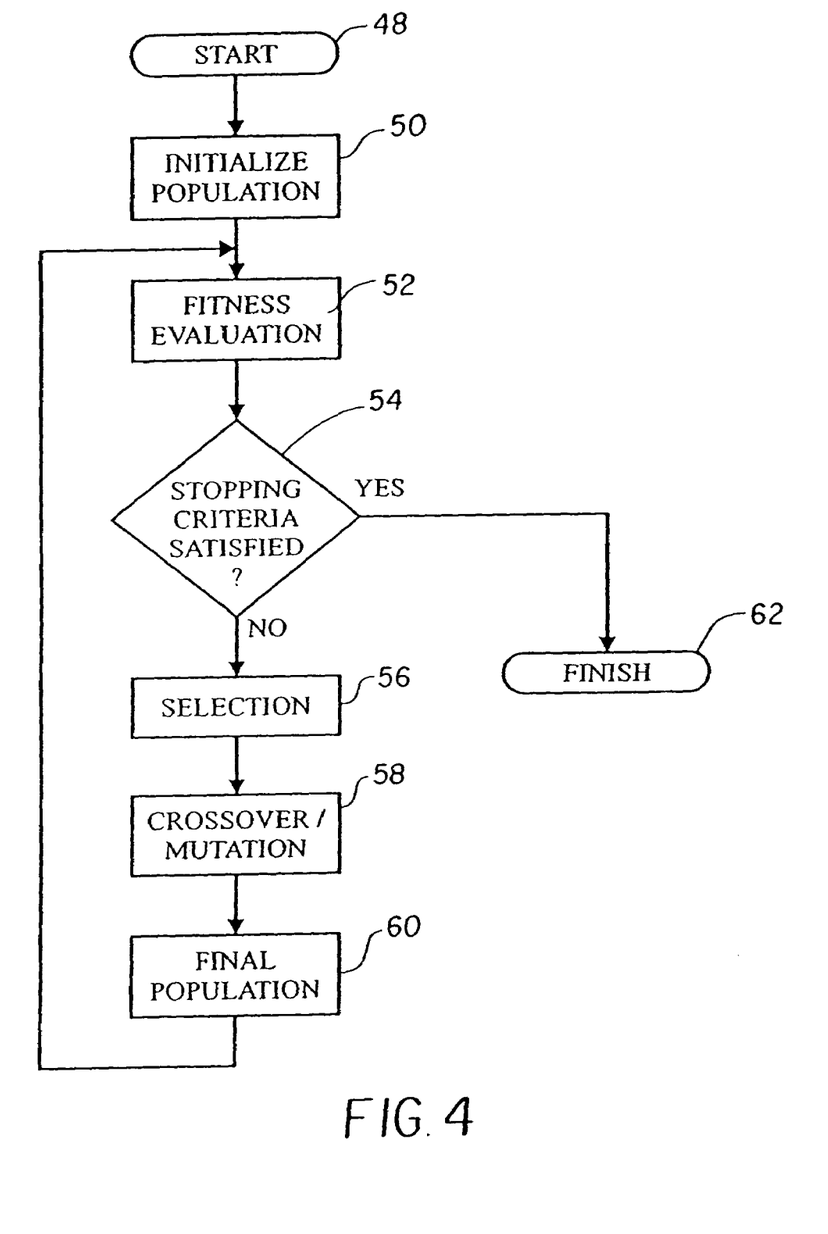
FIG. 4 is a basic genetic algorithm flowchart according to an illustrative embodiment of the present invention.

With a rule that defines each specific mixture of sub-populations as a chromosome, a genetic algorithm can be utilized to find the chromosome that has the best fitness (i.e. is a global optimum of the objective function). The basic flow of a genetic algorithm is shown in FIG. 4. The process begins at step 48 and proceeds to step 50 where an initial generation (collection of chromosomes) is chosen. At step 52, the fitness values (objective function values) are computed for each chromosome. The stopping criteria are checked at step 54, which entails a determination if the fitting error is acceptably low. If it is, then the process is exited at step 62. Otherwise, if the stopping criteria are not met at step 54, then individual chromosomes are selected for reproduction at step 56. Reproduction is simulated by crossover and mutation operators at step 58. A final population is thus formed at step 60, and, and the process is repeated by replacing the initial generation of chromosomes from step 50 with the final population from step 60 and repeating the process from step 52. Many varieties of the basic genetic algorithm have arisen in the literature as noted herein before. But, it will be understood by those skilled in the art that the use of a different optimization technique to find the optimal parameters of the population mixture model, with an indefinite number of parameters, will not deviate from the spirit or scope of this invention.

An objective-function can be defined as a vector representation of a plurality of function parameters.

In the preferred embodiment, single-point genetic crossover (with probability of crossover $p_c = 0.7$) is suggested as sufficient. After two chromosomes are crossed over, the mutation operator is applied to the offspring. Each allele (an allele is a single element of chromosome x) is mutated with probability $p_m = 0.001$. Since the chromosomes are not binary vectors, the mutation of an allele is defined by the function $\omega(x)$:

$$\omega(x) \begin{cases} \kappa, & x = 0 \\ 0, & x \neq 0 \end{cases}, \quad (24)$$

where $\kappa$ is a random variable uniformly chosen from the possible values of $\sigma$. Equation (24) allows a new sub-population to be entered into the mixture or a current sub-population to be removed, thereby effectively changing the number of probability density functions, n. Given a current generation of chromosomes, selection occurs by probabilities weighted by the inverse of the relative fitness of the chromosomes. The inverse is taken since the goal is to minimize, not maximize, the objective function. An initial population of N chromosomes (N=25, 50, or 100 are reasonable choices in the preferred embodiment) must be chosen so that it provides adequate coverage of parameter space. Since it is assumed that each histogram has at least two sub-populations (otherwise segmentation would be meaningless), an initial chromosome x is generated by randomly choosing the number of modes n and then randomly choosing n elements of x in which to place nonzero values. The nonzero values are chosen uniformly from the set of possible standard deviations. The random choice of n can be achieved by assigning $n = 2 + \rho$, where $\rho \sim$ Poisson($\lambda$). In the preferred embodiment, a reasonable choice for the mean of $\rho$ is $\lambda = 3$.

To fully describe this technique for histogram thresholding, all that remains is the definition of the fitness function. As noted above, for this problem, a fitness function is defined that not only takes residual error into account, but also the number of sub-populations required to adequately explain variation. Through the use of the crossover and mutation operators, the genetic algorithm can mix and match sub-populations, effectively treating the number of sub-populations in the population mixture model as another parameter. This process does require modification to the objective function (Equation 3). If the objective function only computes some error measure, such as the sum of squared errors between the data and the model as shown in Equation 3, the minimum error will naturally occur when the maximum number of sub-populations are used. Therefore, in the preferred embodiment, the objective function must include both some error measure and some notion of the relative contributions of the individual sub-populations to the model fit. The preferred way of including these contributions is to use a statistical F-test to reduce the error term in the objective function when the number of sub-populations in the mixture model is adequate. This is accomplished by computing the error in a "master chromosome" model. This means computing the error by the model containing all sub-populations in a given generation of the genetic algorithm. In order to do this, divide the fitness computation into two parts. When a given chromosome is created, calculate the residuals of the corresponding population model and determine the sum squared error (sse) as follows:

$$sse(x) = \sum_{j=1}^{m} \left[ h(\hat{x}_j, \beta_x, \mu_x, \sigma_x) - \hat{h}_j \right]^2 \quad (25)$$

where $\beta_x$, $\mu_x$, and $\sigma_x$ are the parameters of the histogram model Equation (1) associated with the chromosome x, and the m ordered pairs ($\hat{x}_j$, $\hat{h}_j$) compose the histogram. This calculation is performed for each chromosome in a given generation. Once the entire generation has been created, a master chromosome M that contains every unique ($\mu, \sigma$) pair that exists in any chromosome of the generation is formed. Note that it may not be possible to explicitly code M as a chromosome because there may be multiple Gaussians with the same mean. It is not necessary to do this, however, all that is needed is to store $\mu_M$ and $\sigma_M$, the means and standard deviations of all Gaussians described by M. Given $\mu_M$ and $\sigma_M$, LSEI problem can be solved (Equation (3)) for $\beta_M$. In the statistical sense, $h(x,\beta_M,\mu_M,\sigma_M)$ can be thought of as the "full" model and $h(x,\beta_x,\mu_x,\sigma_x)$ as a reduced model of the histogram. Using an F test, a fitness function $f(x)$ can be defined that accounts for both residual error and for the ability to explain variation:

$$f(x) = \frac{sse(x)}{F_{\alpha,k-n,m-(k+1)}} \left[ \frac{(sse(x) - sse(M))(m - (k+1))}{sse(M)(k-n)} \right] \quad (26)$$

where k is the number of modes in M and $F_{\alpha,k-n,m-(k+1)}$ is the critical value for an F distribution with parameters $\alpha(=0.05)$, k–n, and m–(k+1). The effect of Equation (26) is to increase Equation (25) when the hypothesis that the reduced model is acceptable would be rejected and to decrease Equation (25) when this hypothesis would not be rejected. Equation (26) is driven to a minimum when both the residuals are small and n is not deemed unacceptable.

However, two problems can potentially arise. First, the number of modes in M can exceed the number of data points m extracted from the histogram. If this occurs in a given generation, the histogram is resampled so that as many points are needed are extracted. The second problem is that if two or more modes in M are similar (means and standard deviations are close), the predictor matrix in the LSEI problem can be poorly scaled. If this is the case, it is acceptable to remove modes from M that are nearly linearly dependent on other modes.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of fitting a plurality of sub-population functions to digital image data, comprising the steps of:
   defining a plurality of collections and a set of bins, each of said collections having an initial set of functions corresponding to different ones of said bins, said functions each having one or more function parameters;
   determining a plurality of fitness values, each of said fitness values defining a difference between a respective one of said collections and the data;
   comparing each said fitness value to stopping criteria to determine if said stopping criteria is satisfied;
   if, at said comparing step, said stopping criteria is not satisfied, then altering said plurality of collections to provide a next generation of said collections; and
   following said altering step, iterating said determining, comparing, and altering steps;
   wherein one or more of said altering steps further comprise:
      randomly selecting one of said collections of the respective said next generation and one of said bins;
      if the randomly selected bin and one of said functions in the randomly selected collection correspond, deleting said corresponding function;
      if the randomly selected bin has no corresponding function in the randomly selected collection, adding to the randomly selected collection a new function corresponding to said randomly selected bin, said new function having one or more randomly selected function parameters.

2. The method of claim 1 wherein said collections are each defined as a vector representation of said plurality of function parameters.

3. The method of claim 1 further comprising the steps of specifying at least a first threshold value delineating said plurality of functions of each of said collections.

4. The method of claim 3 wherein said at least a first threshold value is calculated based upon the likelihood of misclassification of data.

5. The method of claim 3 further comprising the step of segmenting the data according to said at least a first threshold value.

6. The method of claim 3 wherein said collections are each defined as a vector representation of said plurality of function parameters.

7. The method of claim 2 wherein said altering step is accomplished by evolving said plurality of collections according to a genetic, wherein said genetic algorithm includes a mutation operator comprising said randomly selecting, deleting, and adding steps.

8. The method of claim 7 wherein said evolving includes crossover followed by said mutation operator.

9. The method of claim 1 wherein said plurality of functions are normal distributions, and said plurality of functions parameters include the mean and standard deviations of said normal distributions.

10. The method of claim 1 wherein said comparing step includes the utilization of a statistical f-test to evaluate the relative contribution of each of said plurality of functions in comparison of said fitting error and the data.

11. The method of claim 1 wherein the data is organized as a histogram.

12. The method of claim 1 wherein said stopping criteria are defined by a fitness function.

13. The method of claim 12 wherein said fitness function is optimized to minimize the magnitude of the fit error between each of said collections and the data.

14. An apparatus for fitting a plurality of sub-population functions to digital image data, comprising:
   means for defining a plurality of collections and a set of bins, each of said collections having an initial set of functions corresponding to different ones of said bins, said functions each having a plurality of function parameters;
   means for determining a plurality of fitness values, each of said fitness values defining a difference between a respective one of said collections and the data;
   means for comparing each said fitness value to stopping criteria to determine if said stopping criteria is satisfied;
   means for altering said plurality of function parameters to provide a next generation of said collections, if said means for comparing determines that said stopping criteria is not satisfied; and
   means for iterating said determining, comparing, and altering steps following said altering step;
   wherein one or more of said iterated altering steps further comprise:
      randomly selecting one of said collections of the respective said next generation and one of said bins;
      if the randomly selected bin and one of said functions in the randomly selected collection correspond, deleting said corresponding function;

if the randomly selected bin has no corresponding function in the randomly selected collection, adding to the randomly selected collection a new function corresponding to said randomly selected bin, said new function having one or more randomly selected function parameters.

15. The apparatus of claim 14 wherein said collections are each defined as a vector representation of said plurality of function parameters.

16. The apparatus of claim 14 further comprising means for specifying at least a first threshold value delineating said plurality of functions.

17. The apparatus of claim 16 wherein said at least a first threshold value is calculated based upon the likelihood of misclassification of data.

18. The apparatus of claim 16 further comprising means for segmenting the data according to said at least a first threshold value.

19. The apparatus of claim 15 wherein said means for altering operation is accomplished by evolving said plurality of collections according to a genetic algorithm; wherein said genetic algorithm includes a mutation operator, said mutation operator comprising said randomly selecting, deleting, and adding steps.

20. The apparatus of claim 19 wherein said genetic algorithm includes crossover followed by said mutation operator.

21. The apparatus of claim 14 wherein said plurality of functions are normal distributions, and said plurality of functions parameters include the mean and standard deviations of said normal distributions.

22. The apparatus of claim 14 wherein said means for comparing includes the utilization of a statistical f-test to evaluate the relative contribution of each of said plurality of functions parison of said fitting error and the data.

23. The apparatus of claim 14 wherein the data is organized as a histogram.

24. The apparatus of claim 14 wherein said stopping criteria are defined by a fitness function.

25. The apparatus of claim 24 wherein said fitness function is optimized to minimize the magnitude of the fit error between said each of said collections and the data.

26. A method of specifying thresholds for segmenting a digital image, comprising the steps of:
producing a histogram of the image, the histogram having histogram data, said histogram defining a plurality of bins;
defining a plurality of mixture models, each said mixture model being a combination of a plurality of subpopulations, wherein each subpopulation is a function defined according to a plurality of function parameters;
defining a generation of chromosomes, each said chromosome being a vector having a plurality of elements, each said element corresponding to a respective one of said bins, each said element having a zero value or a non-zero value, each of said non-zero value elements encoding the function Parameters of a respective one of said sub-populations;
for each chromosome in the generation, performing the following steps:
determining the fitting error between the mixture model defined by the chromosome and the histogram data;
determining a measure of the relative contributions of the individual sub-populations defined by the chromosome; and
determining a fitness value based on said fitting error and said measure of relative contributions;
comparing said fitness values to stopping criteria;
altering said chromosomes of said generation to define a next generation of chromosomes, if none of said fitness values satisfies said stopping criteria; and
repeating said performing, comparing, and altering steps on said next generation of chromosomes, if none of said fitness values satisfies said stopping criteria, wherein one or more of said repeated altering steps further comprise:
randomly selecting one or more of said elements; and
replacing each of the randomly selected non-zero value elements with a zero value element and each of the randomly selected zero value elements with a non-zero value element encoding randomly selected function parameters of a new sub-population; and
specifying at least a first threshold value delineating said sub-populations in a respective said mixture model, if at least one of said fitness values satisfies said stopping criteria.

27. The method of claim 26 wherein said at least a first threshold value is calculated based upon the likelihood of misclassification of said histogram data.

28. The method of claim 26 wherein said plurality of functions are normal distributions, and said plurality of functions parameters include the mean and standard deviations of said normal distributions.

29. The method of claim 26 wherein said comparing step includes the utilization of a statistical f-test to evaluate the relative contribution of each of said plurality of functions in comparison of said fitting error and the data.

30. The method of claim 26 wherein said stopping criteria are defined by a fitness function.

31. The method of claim 30 wherein said fitness function is optimized to minimize the magnitude of the fit error between said mixture model and the data.

32. An apparatus for specifying thresholds for segmenting a digital image, comprising:
means for producing a histogram of the image, the histogram having histogram data, said histogram defining a plurality of bins;
means for defining a plurality of mixture models, each said mixture model being a combination of a plurality of subpopulations, wherein each subpopulation is a function defined according to a plurality of function parameters;
means for defining a generation of chromosomes, each said chromosome being a vector having a plurality of elements, each said element corresponding to a respective one of said bins, each said element having a zero value or a non-zero value, each of said non-zero value elements encoding the function parameters of a respective one of said sub-populations;
for each chromosome in the generation, means for performing the following steps:
determining the fitting error between the mixture model defined by the chromosome and the histogram data;
determining a measure of the relative contributions of the individual sub-populations defined by the chromosome; and
determining a fitness value based on said fitting error and said measure of relative contributions;
means for comparing said fitness values to stopping criteria;

means for altering said chromosomes of said generation to define a next generation of chromosomes, if none of said fitness values satisfies said stopping criteria; and means for repeating said performing, comparing, and altering steps on said next generation of chromosomes, if none of said fitness values satisfies said stopping criteria, wherein one or more of said repeated altering steps further comprise:

randomly selecting one or more of said elements; and replacing each of the randomly selected non-zero value elements with a zero value element and each of the randomly selected zero value elements with a non-zero value element encoding randomly selected function parameters of a new sub-population; and means for specifying at least a first threshold value delineating said sub-populations in a respective said mixture model, if at least one of said fitness values satisfies said stopping criteria.

33. The method of claim 1 wherein said altering further comprises randomly applying a genetic crossover operator to provide one or more pair of offspring collections, said deleting and adding being limited to said offspring collections.

34. The method of claim 33 wherein said crossover operator is a single-point genetic crossover operator.

* * * * *

UNITED STATES PATENT AND TRADEMARK OFFICE
CERTIFICATE OF CORRECTION

| | | |
|---|---|---|
| PATENT NO. | : 7,103,219 B2 | Page 1 of 1 |
| APPLICATION NO. | : 09/833377 | |
| DATED | : September 5, 2006 | |
| INVENTOR(S) | : Nathan D. Chill | |

It is certified that error appears in the above-identified patent and that said Letters Patent is hereby corrected as shown below:

Col. 19 line 35, Claim 22 Replace "parison" with -- in comparison --

Signed and Sealed this

Seventeenth Day of April, 2007

JON W. DUDAS
*Director of the United States Patent and Trademark Office*